(12) United States Patent
Petrenko et al.

(10) Patent No.: US 9,197,141 B2
(45) Date of Patent: Nov. 24, 2015

(54) PIEZOELECTRIC MOTOR WITH EFFICIENT TRANSFER OF ENERGY

(71) Applicant: Discovery Technology International, Inc., Sarasota, FL (US)

(72) Inventors: Serhiy F. Petrenko, Kiev (UA); Viacheslav V. Lavrinenko, Kiev (UA)

(73) Assignee: Discovery Technology International, Inc., Sarasota, FL (US)

( * ) Notice: Subject to any disclaimer, the term of this patent is extended or adjusted under 35 U.S.C. 154(b) by 343 days.

(21) Appl. No.: 13/848,525

(22) Filed: Mar. 21, 2013

(65) Prior Publication Data

US 2014/0077658 A1    Mar. 20, 2014

(30) Foreign Application Priority Data

Sep. 18, 2012    (UA) .............................. 20120910895

(51) Int. Cl.
| | |
|---|---|
| H02N 2/00 | (2006.01) |
| H02N 2/02 | (2006.01) |
| H02N 2/04 | (2006.01) |
| H02N 2/10 | (2006.01) |
| H02N 2/12 | (2006.01) |

(52) U.S. Cl.
CPC .............. *H02N 2/0065* (2013.01); *H02N 2/006* (2013.01); *H02N 2/021* (2013.01); *H02N 2/04* (2013.01); *H02N 2/101* (2013.01); *H02N 2/12* (2013.01); *H02N 2/002* (2013.01)

(58) Field of Classification Search
CPC ....... H02N 2/065; H02N 2/002; H02N 2/006; H02N 2/04; H02N 2/101; H02N 2/12
USPC ................ 310/321, 323.01, 323.02, 328, 322
IPC ......................................................... H02N 2/00
See application file for complete search history.

(56) References Cited

U.S. PATENT DOCUMENTS

| | | | |
|---|---|---|---|
| 4,453,103 A * | 6/1984 | Vishnevsky et al. ..... | 310/323.02 |
| 4,959,580 A * | 9/1990 | Vishnevsky et al. ..... | 310/323.02 |
| 7,211,919 B2 | 5/2007 | Kalsi et al. | |
| 7,737,605 B2 * | 6/2010 | Wischnewskij et al. . | 310/323.02 |
| 7,816,839 B2 | 10/2010 | Chen et al. | |
| 7,973,451 B2 | 7/2011 | Wischnewskij et al. | |

* cited by examiner

*Primary Examiner* — Thomas Dougherty
*Assistant Examiner* — Karen B Addison
(74) *Attorney, Agent, or Firm* — Young Basile

(57) ABSTRACT

Provided are embodiments of piezoelectric motors which comprise at least one piezo-electrically active part and one passive part which are mounted with the ability of relative movement with respect to each other and which interact with each other by friction. The piezo-electrically active part includes at least one oscillator of acoustic vibrations with one or more piezoelectric elements in the form of a planar ring with acoustically attached flat pushers made from materials such as steel or ceramic. The flat pushers are pressed to a flat surface of the piezoelectric element, either directly or through an elastic element.

13 Claims, 7 Drawing Sheets

PIEZOELECTRIC MOTOR WITH EFFICIENT TRANSFER OF ENERGY

TECHNICAL FIELD

This invention relates, in general, to electric motors based on friction, and relates particularly to piezoelectric motors where electric energy is transformed to mechanical energy by means of reversal piezoelectric effect, while the transformation of mechanical periodic vibrations (micro-movements) into directional movement is implemented by means of frictional force. Such devices could be used for obtaining either big force (linear motors) or torque (rotational motors) with numerous applications in industry.

BACKGROUND

Piezoelectric rotational motors are known having at least one piezo-electrically active part and one passive part, mounted with the capacity of relative movement in respect to each other and which interact with each other by friction.

A piezoelectric motor was chosen with a piezo-electrically active part comprising at least one oscillator of acoustic vibrations in the form of a planar ring-shaped piezoelectric element and flat pushers, mounted perpendicular with respect to the flat surfaces of the piezoelectric element and in acoustical contact with the flat pushers.

The disadvantage of this type of motor is that, with the perpendicular arrangement of the plane of the pushers in respect to the piezoelectric element surface, it is very difficult to create linear motors with high force or rotary motors with high starting torque. This is due to the low transmission efficiency of acoustic energy (vibrations) from the piezoelectric element to the pushers. Indeed, in a perpendicular arrangement of the pushers to the flat surface of the piezoelectric element, the acoustic energy supplied to each pusher comes through the pusher's edge, or a part of its surface, which greatly reduces the efficiency of such system.

SUMMARY

The embodiments herein address at least the above problems, providing the means for designing of piezoelectric linear motors with increased force and piezoelectric rotary motors with increased starting torque due to a more efficient attachment of the pushers.

Embodiments herein that address the noted problems are piezoelectric motors comprising at least one piezo-electrically active part and one passive part which are mounted with the ability of relative movement with respect to each other and which interact with each other by friction. The piezo-electrically active part includes at least one oscillator of acoustic vibrations with one or more piezoelectric elements in the form of a planar ring with acoustically attached flat pushers made from materials such as steel or ceramic. The flat pushers are pressed to a flat surface of the piezoelectric element, either directly or through an elastic element.

In order to increase the efficiency of the motor, the flat pushers are assembled into pusher packets and installed on one or both sides of each piezoelectric element and evenly pressed against them with a screw-nut assembly through elastic thin rings, e.g. thin steel rings with a diameter smaller than that of the piezoelectric element.

In front of each pusher or pusher packet, an additional holding plate can be installed on the side opposite to the direction of pusher pointing, while this holding plate does not contact frictionally with the passive part.

Additionally, the radial frequency of the piezoelectric element can coincide with the first longitudinal vibrational frequency along the pusher length.

In order to build rotary motor on the same principle, the motor can be equipped with at least one passive part and one active part—oscillator, while the latter is mounted on an arm fixed on the shaft of the motor, with the shaft rotationally attached to the passive part of the motor.

In order to extend the functionality of the motor, it can be equipped with two piezo-electrically active parts and common passive part, while the direction of movement originated from each active part is in the same direction.

Additionally, in order to build a reverse motor, piezo-electrically active parts are mounted radially, with the first active part mounted firmly to the case, and the other active part fixed to the shaft, while piezo-electrically passive part is rotational in relation to the shaft and the case of the motor.

Additionally, in order to build transport device, two piezo-electrically active parts are mounted in parallel firmly to the case, and the case is made with the possibility of movement in relation to the plane of the passive part.

BRIEF DESCRIPTION OF THE DRAWINGS

The various features, advantages and other uses of the present apparatus will become more apparent by referring to the following detailed description and drawing in which.

DETAILED DESCRIPTION

Piezoelectric motor (FIG. 1) consists of two parts, which can move in respect to each other, one of which is a piezo-electrically active part 1, which includes at least one piezo-electric oscillator of acoustic vibrations 2. The second part 3 is piezo-electrically passive and interacts with the piezo-electrically active part 1 via frictional forces through the spring-loaded pushers 6.

Figure 2:
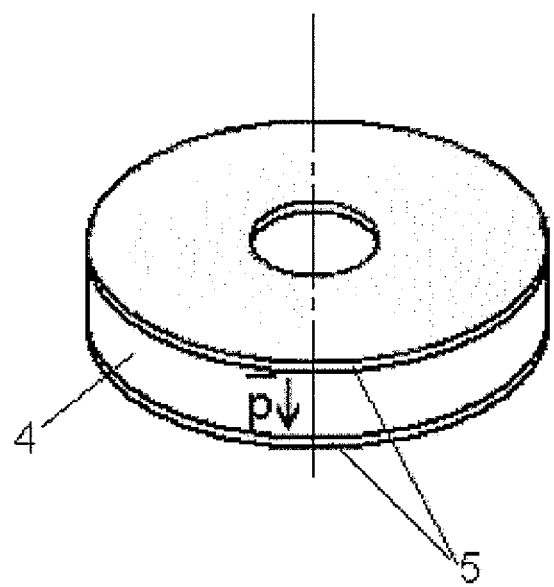
FIG. 2 is a perspective view of a ring piezoelectric element as disclosed herein.
Figure 3:
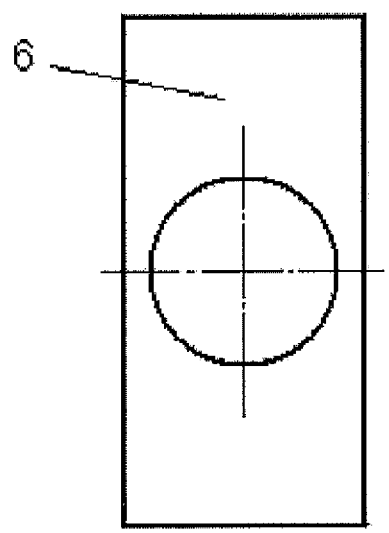
FIG. 3 is a view of a pusher as disclosed herein.

In a high-force version of the motor (FIG. 1), its oscillator 2 consists of four piezoelectric ring-shaped elements 4 (FIG. 2), which are polarized along the thickness direction (the polarization vector $\vec{P}$ is perpendicular to the side flat surfaces). Metal coatings are deposited on the flat surfaces of the piezoelectric elements 4, which serve as electrodes 5 for excitation of the piezoelectric elements 4. In the high-force version of the motor (FIG. 1), all piezoelectric elements are mounted so that the polarization vector $\vec{P}$ is pointing in the same direction. One pusher 6, usually in rectangular shape (FIG. 3) or several pushers forming a packet, are mounted between the piezoelectric elements. Pushers 6 are made, for example, from elastic steel. Screw 7 with nut 8 press pushers 6 to each other directly or through a thin metal ring 9 to the flat surfaces of the piezoelectric elements 4. Screw 7 is acoustically isolated from the oscillator 2 through a ring 10 (made from cardboard) and a thin-walled cylindrical body 11 (made from nylon).

Figure 1:
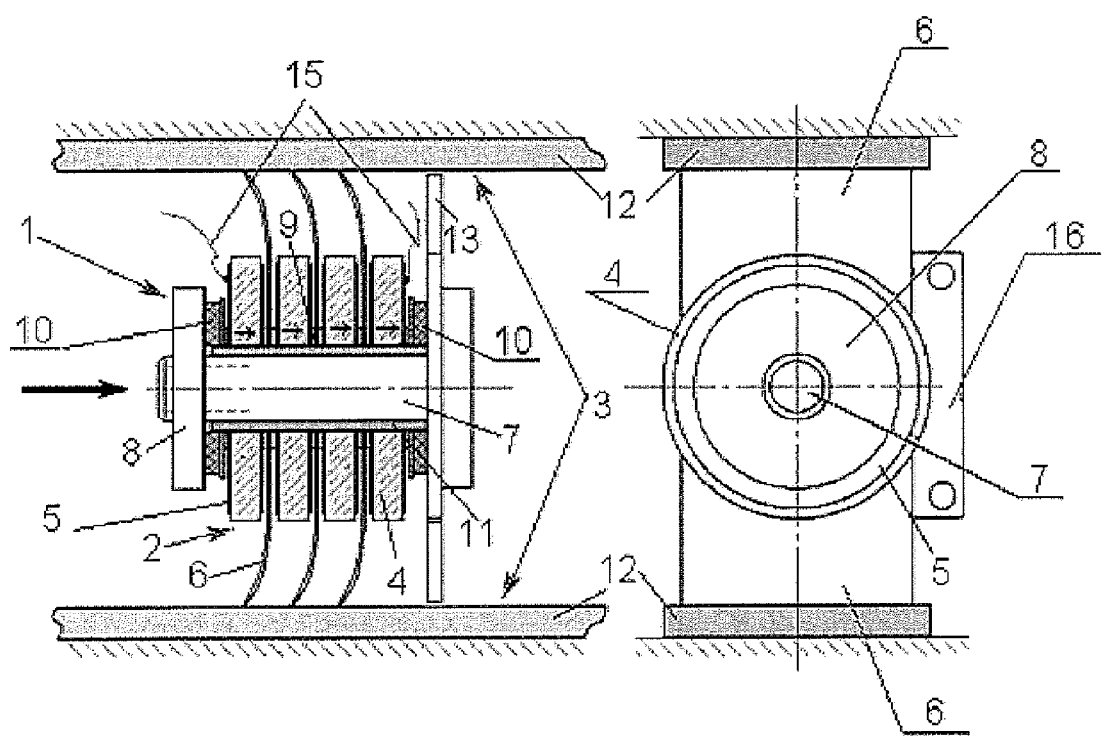
FIG. 1 is a schematic front and side view of a motor as disclosed herein.

The oscillator 2 is mounted between two parallel flat plates 12 made from firm materials (glass, ceramic, steel), which are subjected to elastic deformations only. The flat plates 12 form the stator and are an integral element of the passive part 3 (FIG. 1). Since the distance between the plates 12 is less than the length of the pushers 6, the pushers 6 elastically bend during the mounting of the oscillator 2 in the stator, providing the desired angle and pressing force of the pusher ends in respect to the surfaces of the plates 12. This ensures frictional contact between the piezo-electrically active 1 and passive 3 parts.

Figure 4:
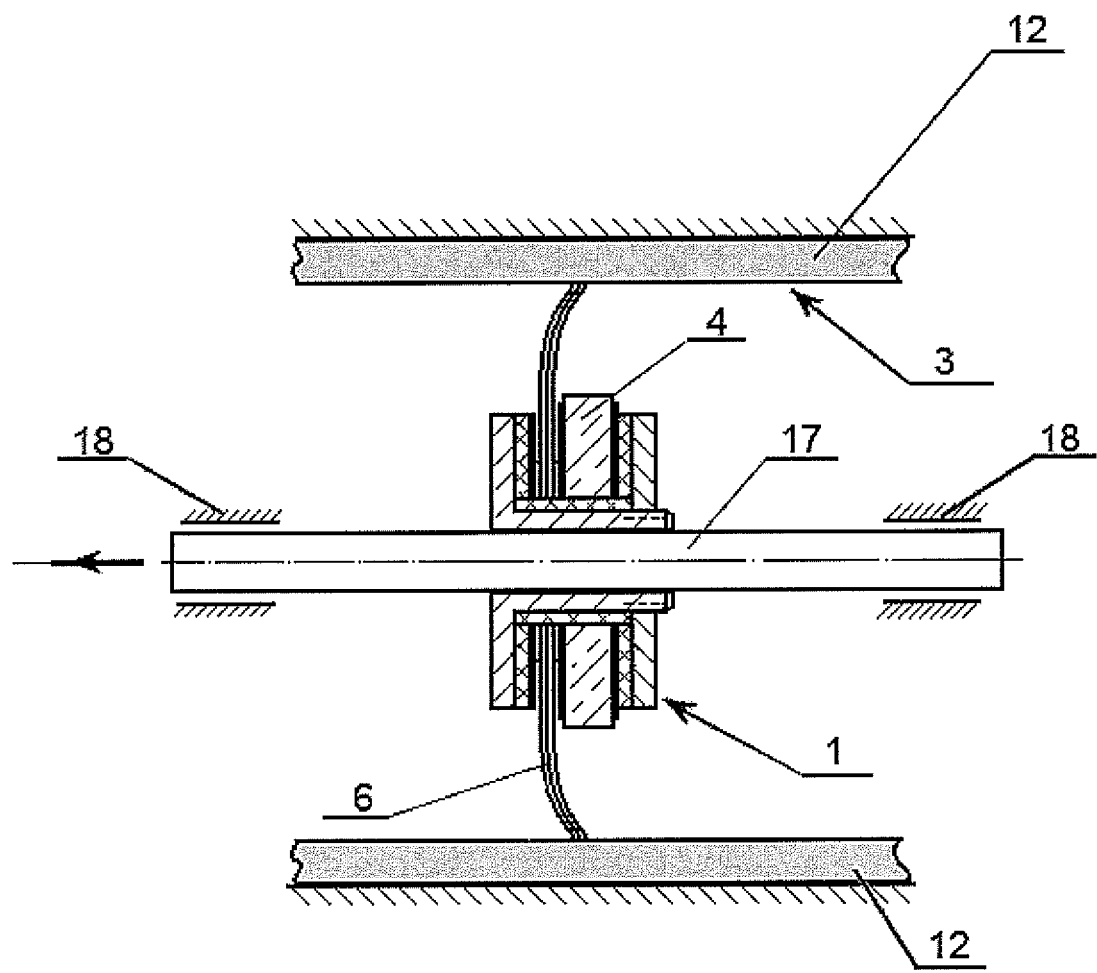
FIG. 4 is a schematic of a motor with one piezoelectric element and an axial stopper-bearing.

However, the positioning of oscillator 2 in respect to plates 12 is not stable due to the inherent elasticity of the pushers 6. To eliminate this problem, the motor is equipped with a holding element 13, which does not allow the oscillator 2 to rotate in respect to plates 12. The holding element can be made as a thick flat plate 13 fixed on the oscillator 2 (FIGS. 1, 5, and 8) or in the form of axial bearing 18 (FIG. 4), which guides the moving oscillator. To prevent damage of the pushers 6, when an external force F is applied to the oscillator in direction opposite to the movement, an oscillator stopper plate 14 is additionally introduced (FIG. 5), which is not in frictional contact with the passive part 3.

Figure 5:
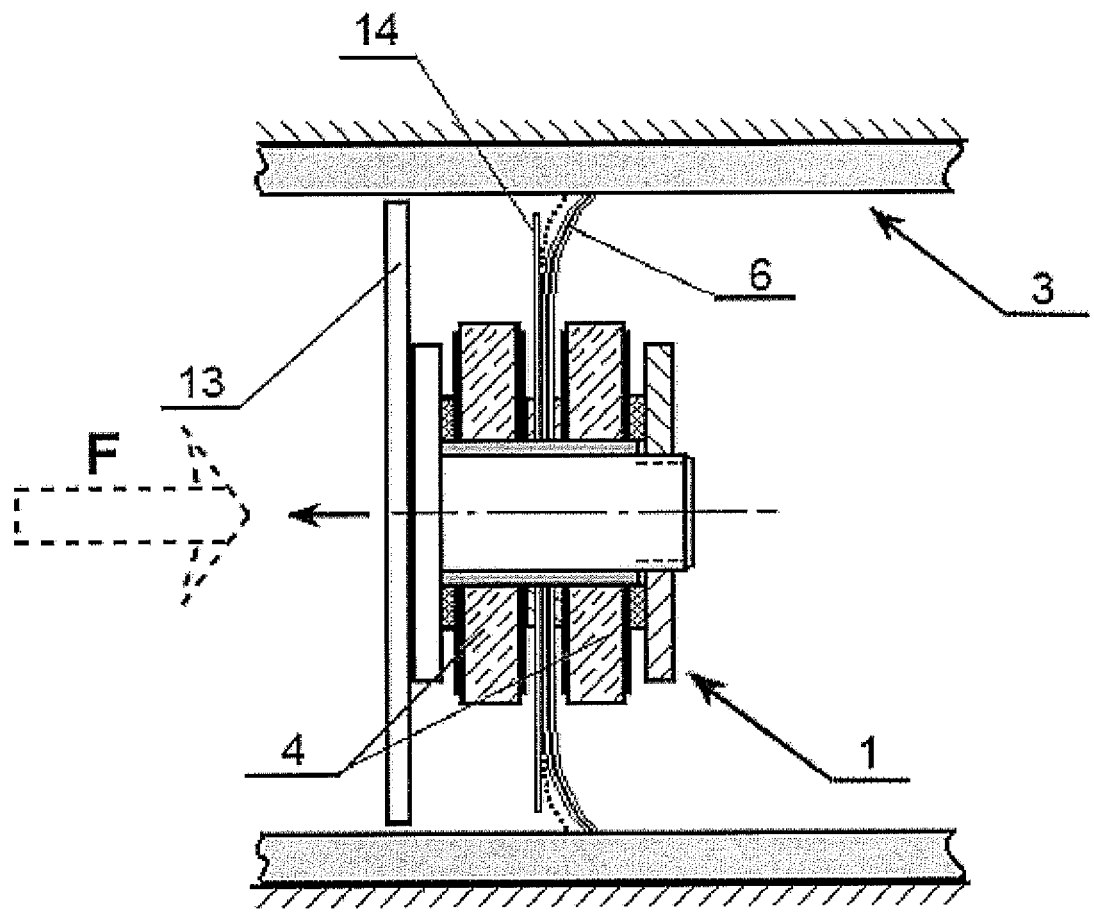
FIG. 5 is a schematic of a motor with two piezoelectric elements and a thrust plate.

During the application of an external force F the pushers 6 bend, as shown in FIG. 5 by the dashed line. The stopper plate 14 operates as a restricting support, which provides additional rigidity to the pushers 6 and prevents breakage. This plate enhances the driving force of the oscillator 2 during external opposing load.

Connectors 15 are used to connect the motor to AC power source (FIG. 1). They are soldered to the electrodes of the piezoelectric element.

Supporting bracket 16 (FIG. 1) is used for building of either rotary motor of carousel type (FIG. 6) or for reverse motors. In a carousel motor (FIG. 6) the piezo-electrically active moving part 1 is attached to the arm 19 by bracket 16, which is acoustically isolated from the oscillator 2. Correspondingly, the arm 19 is fixed to the rotational axis 20, which is fixed to the passive part 3, i.e., to the plates 12 and rotates in relation to them.

Figure 7:
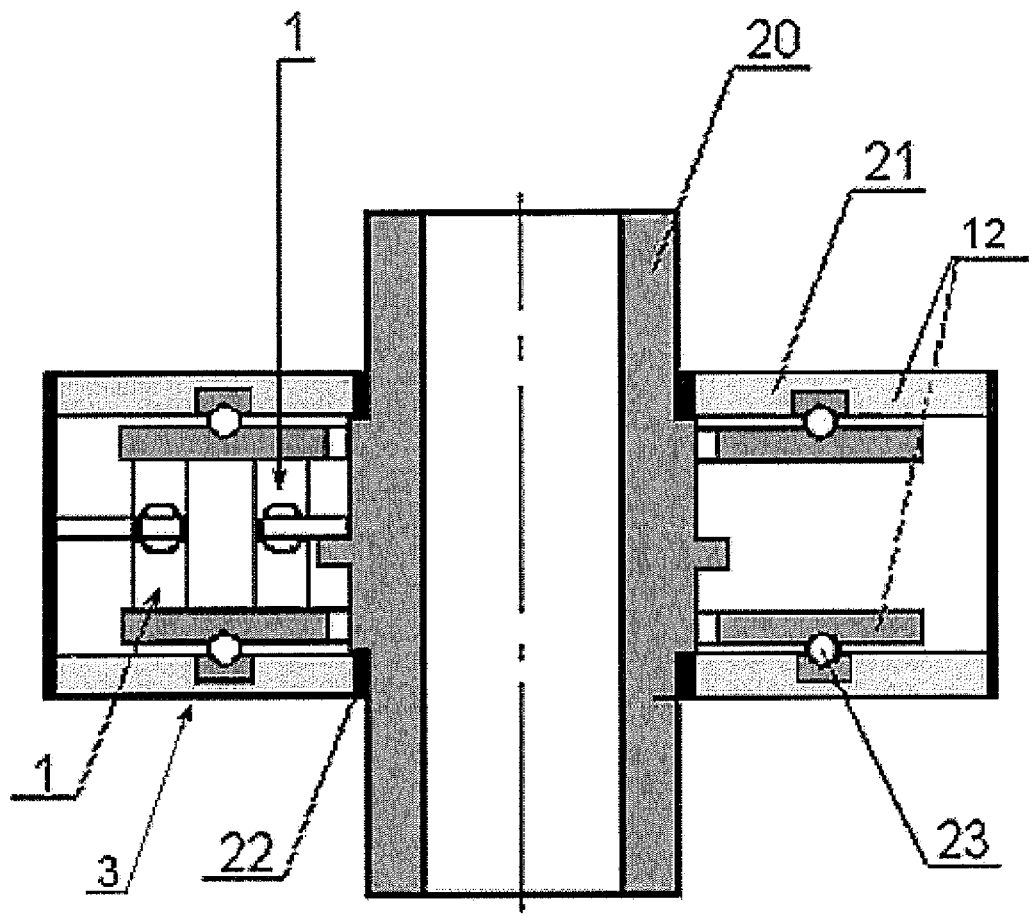
FIG. 7 is a view of a reverse motor.
Figure 8:
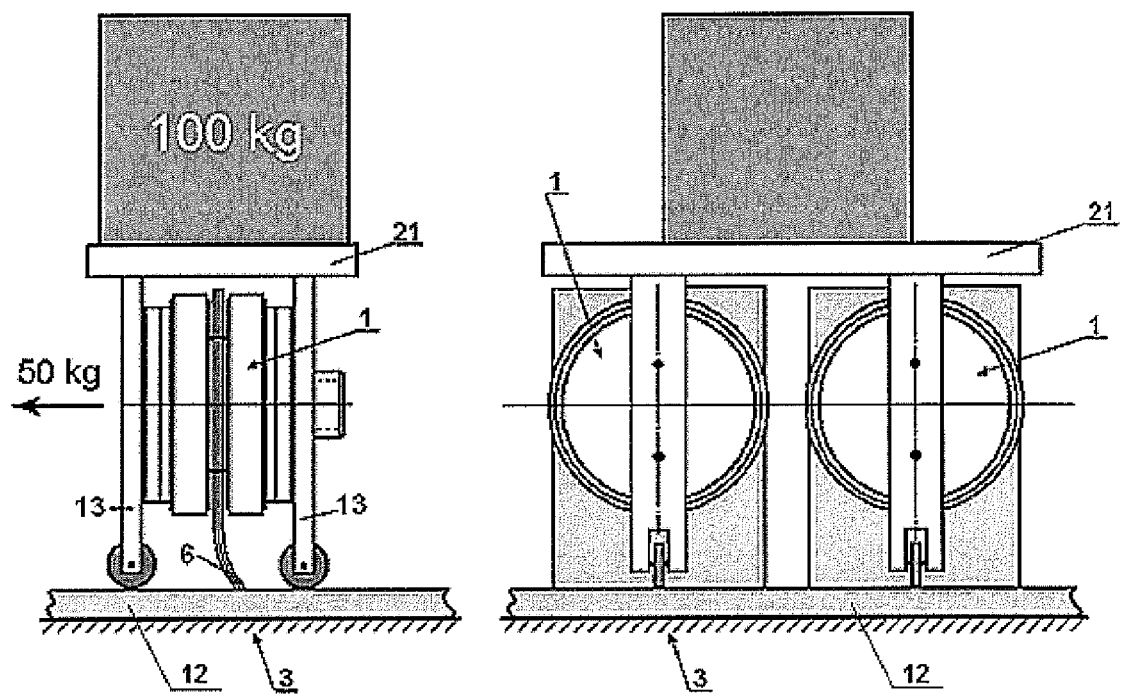
FIG. 8 is a side and front view of a transport device.

To ensure reverse movement of the rotary motor shown in FIG. 7, or changing of direction of movement (turning) of the transport unit shown in FIG. 8, the piezoelectric motor has two piezo-electrically active parts 1.

The motor operates as follows. When connectors 15 (FIG. 1) are connected to the AC power source, radial mechanical vibrations are generated in the piezoelectric elements 4 due to the inverse piezoelectric effect. The maximum amplitude of these oscillations occurs at the resonance frequency, i.e. when the frequency of the excitation voltage signal coincides with the frequency of the natural mechanical radial oscillations of the piezoelectric element. Usually, the frequency of these oscillations lies in the ultrasonic range of 20-150 kHz. The amplitude of these oscillations (~1 μm) is bigger when the acoustic losses in the insulating elements 10, 11 of the screw nut 7 and 8 are smaller. Therefore, the elements 10, 11 are made of acoustically insulating materials. These oscillations of the piezoelectric element directly, or through a thin elastic ring 9 are transmitted to the pushers 6, the ends of which are also beginning to vibrate longitudinally.

The amplitude of these oscillations is at a maximum when the frequency of the radial oscillations of the piezoelectric element coincides with the first-order longitudinal vibration frequency of the pushers along their length. The reason for that is that there are two parametrically coupled resonators, and the vibrations from the first resonator (ring shaped piezoelectric resonator 4) is transferred to a second flat longitudinal resonator (pusher 6). The efficiency of transmission of these vibrations is at a maximum in the case when their natural frequencies coincide.

Because the pushers 6 interact frictionally under an angle with flat plates 12 of the passive part 3 (FIG. 1), they are jammed, when they are forced to move in one direction during oscillation and they uncouple when they move in the opposite direction. As a result, in every period of oscillation a stepwise unidirectional movement occurs, which creates a movement of the piezoelectrically active part 1 relatively to the passive (stator) part 3.

In order to increase the dynamic force during the movement, pushers are assembled into packets (FIG. 4), which increases the driving force by increasing the number of acting pushers. Holding element in the form of thick flat plate 13 or axial bearing 18 are used to restrict the movement of the movable part in space in other directions but the desired direction (FIGS. 1, 4, 5, and 8).

The movement of the piezoelectric oscillator is unidirectional, therefore the linear motors (FIGS. 1, 4, and 5) are unidirectional. To prevent damage of the pushers 6, when an external force F is applied to the oscillator in direction opposite to the movement, an oscillator stopper plate 14 is additionally introduced (FIG. 5), which is not in frictional contact with the passive part 3. Additionally, this plate increases the driving force of the motor during opposing force load, by change in the pusher stiffness when opposing force is applied.

Figure 6:
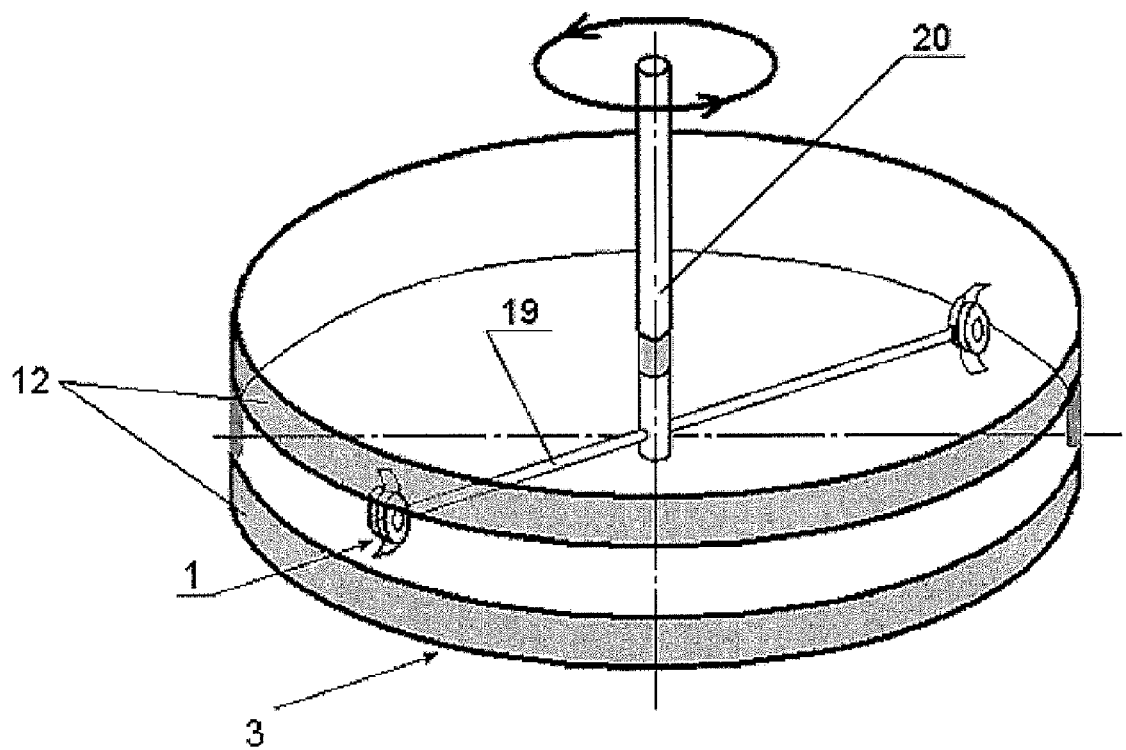
FIG. 6 is a perspective view of a motor of a carousel type.

In one implementation, rotary motor can be built by attaching piezo-electrically active part 1 on the arm 19, which is mounted to the rotational axis 20. The latter is attached to the passive part 3 and rotates in relation to it (FIG. 6). The torque of such system is the product of the driving force of the linear motor and the arm length. The described motor is unidirectional motor of carousel type. Piezoelectric motor of carousel type can develop torque of over 100 N.m.

Reverse rotary motor can be implemented by attaching the stator of one unidirectional motor to the shaft of a second unidirectional motor. In this case, the motor has at least two oscillators, i.e. two piezo-electrically active parts, and each part provides motion in one direction.

One implementation of such reversible motor is shown in the FIG. 7. The motor includes two independent piezo-electrically active parts 1, where the first piezo-electrically active part is mounted radially and firmly to the case 21, and the second is mounted radially and firmly to the shaft 20. Piezoelectrically passive part 3 is incorporated in case 21 with ability of rotation in respect to both case 21 through bearings 23 and shaft 20. Shaft is mounted in bearings 22 (e.g. sliding bearing), attached to case 21.

When the first piezo-electrically active part attached to the case is excited, torque is generated, which rotates the passive part 3, in correspondence with the principle of operation of the unidirectional motor. Further, this torque is transmitted to the second piezo-electrically active part (which is not excited) due to frictional forces of pushers of the second piezoelectric passive part 3. Because the second piezoelectric part is rigidly mounted on the shaft 20, the torque, created by the first piezoelectric active part, is transmitted to the shaft and to the load.

Alternatively, when the second piezo-electrically active part is excited, torque is generated, which tries to turn the passive part 3. However, in this case, the passive part 3 is frictionally braked by pushers of the first piezoelectric part (which is not excited) and is firmly attached to the case.

Therefore, the generated torque is transferred to the second piezo-electrically active part, which is rigidly fixed to the shaft, while the shaft can rotate in relation to the case and the passive part 3. Therefore, in this case, the second piezoelectric part (which is excited), pushes itself off from the fixed (frictionally braked) passive part 3, and the torque is transferred to the second piezoelectric part, and then to the shaft and the load.

Two piezo-electrically active parts 1, mounted in parallel and firmly attached to a common case 21, can propel a vehicle (FIG. 8). The case is designed with the ability of moving in a plane, parallel in relation to the plane of the passive part 3. This can be implemented by using wheel sets installed on the flat holding element 13. Control of the direction of movement is implemented by changing the voltage excitation of one of the oscillators. For example, if the oscillators' excitation voltage is the same, the vehicle moves in a straight line. If the excitation is different, the motor moves along a curved path and it turns.

The use of the proposed technical solution allows creating linear piezoelectric motors with starting force up to 1000 N, rotary piezoelectric motors with starting torque up to 500 Nm, and vehicles with useful load of up to 1000 N.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A piezoelectric motor comprising:
    at least one piezo-electrically active part; and
    a passive part, the at least one piezo-electrically active part and the passive part mounted such that each can move with respect to the other and which interact with each other by friction, wherein the piezo-electrically active part comprises:
    at least one oscillator of acoustic vibrations having one or more piezoelectric elements each formed of a planar ring and having a flat surface, wherein the oscillator is mounted on an arm fixed on a shaft, the shaft assembled within the passive part and rotatable in relation to the passive part; and
    acoustically attached pushers pressed to the flat surface of the piezoelectric element.

2. The piezoelectric motor according to claim 1, wherein the pushers are assembled into packets and mounted on one or both sides of each piezoelectric element and evenly pressed against the flat surface.

3. The piezoelectric motor according to claim 1, wherein a holding plate is installed against the pushers on a side opposite to a direction of deflection of the pushers, while the holding plate is not in frictional contact with the passive part.

4. The piezoelectric motor according to claim 1, wherein a radial oscillation frequency of the one or more piezoelectric elements coincides with a first-order longitudinal vibration frequency of the pushers along a length of the pushers.

5. The piezoelectric motor according to claim 1, wherein the one or more piezoelectric elements in the oscillator are mounted in such way that polarization vectors of the one or more piezoelectric elements are pointing in a same single direction.

6. The piezoelectric motor according to claim 1, wherein the at least one piezo-electrically active part is two piezo-electrically active parts, the passive part being common to the two piezo-electrically active parts, where each of the two piezo-electrically active parts is configured to move in one direction.

7. The piezoelectric motor according to claim 6, wherein the two piezo-electrically active parts are installed radially in respect to the shaft, and wherein a first active part is mounted radially and firmly to a case, and a second active part is mounted radially and firmly to the shaft, and the passive part is configured to rotate in relation to the shaft and the case.

8. The piezoelectric motor according to claim 6, wherein the two piezo-electrically active parts are mounted in parallel and firmly to a case and the case is configured to move in relation to a plane of the passive part.

9. The piezoelectric motor according to claim 1, wherein the pushers are made from one of steel or ceramic.

10. The piezoelectric motor according to claim 1, wherein the pushers are pressed to the flat surface of the one or more piezoelectric element directly.

11. The piezoelectric motor according to claim 1, wherein the pushers are pressed to the flat surface of the one or more piezoelectric element through an elastic element.

12. The piezoelectric motor according to claim 1, wherein the pushers are evenly pressed against the one or more piezoelectric elements using a screw-nut assembly through a thin elastic ring with a diameter smaller than a diameter of the one or more piezoelectric elements.

13. The piezoelectric motor according to claim 2, wherein a holding plate is installed against each pusher packet on a side opposite to a direction of deflection of the pushers, while the holding plate is not in frictional contact with the passive part.

\* \* \* \* \*